United States Patent [19]

de fontenay

[11] Patent Number: 4,834,350
[45] Date of Patent: May 30, 1989

[54] VIBRATION ISOLATION APPARATUS
[75] Inventor: Etienne de fontenay, Decize, France
[73] Assignee: Kléber Industrie, Versailles, France
[21] Appl. No.: 147,348
[22] Filed: Jan. 22, 1988
[51] Int. Cl.$^4$ .............................................. F16F 9/34
[52] U.S. Cl. ................................. 267/140.1; 267/219
[58] Field of Search ............... 248/562; 267/219, 220, 267/136, 140.1

[56] References Cited

U.S. PATENT DOCUMENTS

| | | | |
|---|---|---|---|
| 4,720,084 | 1/1988 | Hollerweger et al. | 267/140.1 X |
| 4,721,288 | 1/1988 | Andrä et al. | 267/140.1 X |
| 4,741,519 | 5/1988 | Dubos et al. | 267/140.1 |

FOREIGN PATENT DOCUMENTS

| | | |
|---|---|---|
| 0164887 | 12/1985 | European Pat. Off. . |
| 0219786 | 10/1986 | European Pat. Off. . |
| 7725634 | 2/1980 | Fed. Rep. of Germany . |
| 3239787 | 9/1983 | Fed. Rep. of Germany . |
| 3245653 | 6/1984 | Fed. Rep. of Germany . |
| 3509000 | 9/1985 | Fed. Rep. of Germany . |
| 3522333 | 1/1987 | Fed. Rep. of Germany . |
| 2467724 | 10/1979 | France . |
| 2511105 | 8/1981 | France . |
| 2535261 | 10/1982 | France . |
| 2543494 | 4/1983 | France . |
| 2559864 | 2/1985 | France . |
| 174737 | 10/1983 | Japan . |
| 59-1830 | 1/1984 | Japan . |
| 0113833 | 6/1985 | Japan ............................... 267/140.1 |

Primary Examiner—Duane A. Reger
Attorney, Agent, or Firm—Thomas N. Ljungman

[57] ABSTRACT

Antivibration isolation device with integrated hydraulic damping, comprising an elastic support consisting of a thick conical elastomer membrane bonded to rigid internal and external framework, and crimped in a rigid casing enclosing a damping liquid acting by the inertia of a very long column, characterized by the fact that an assembly constituted by progressive stops to limit deflections which are rigidly connected to a support washer is enclosed in the chamber thus constituted, and that the space intended for the expansion of the damping liquid is moved to the exterior of the rigid casing, which is the boundary of the elastic support. Application to the suspension of power units of vehicles or truck cabins.

17 Claims, 2 Drawing Sheets

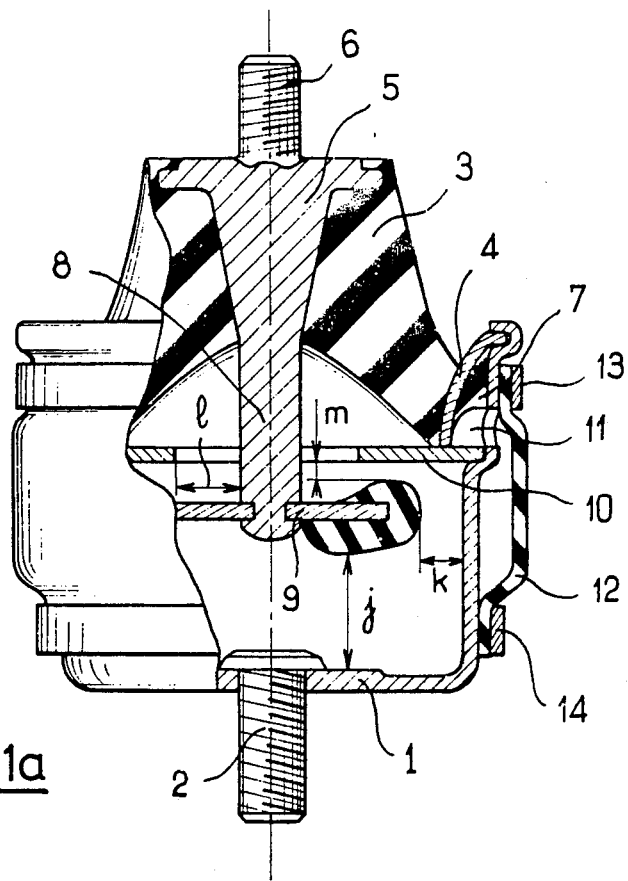
FIG_1a
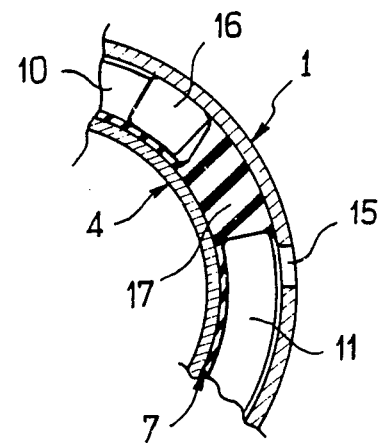
FIG_1b

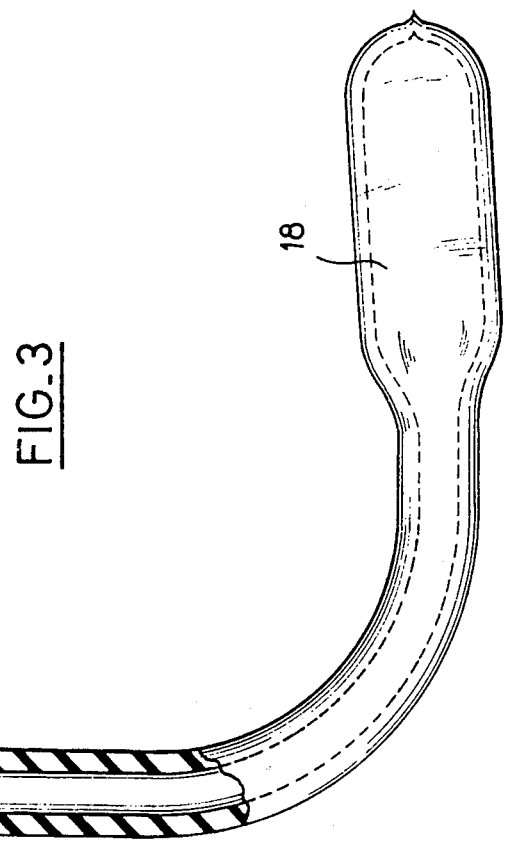
FIG_3
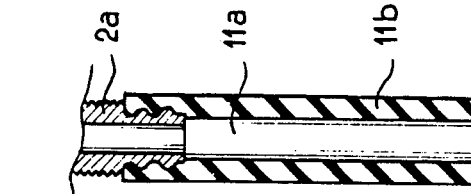
FIG_2

VIBRATION ISOLATION APPARATUS

CROSS-REFERENCE TO CO-PENDING APPLICATIONS

Co-pending application Ser. No. 147,296, filed on Jan. 22, 1988, entitled "Vibration Isolation Apparatus", which corresponds to French Patent Application No. 8700762, filed on Jan. 23, 1987, is assigned to the same assignee as and is related to the instant application.

BACKGROUND OF THE INVENTION

1. Field of the Invention

This invention relates to the field of antivibration isolations for machines, in particular to elastic mountings for automobile motors or mountings for truck cabs. It relates to high-flexibility mountings with integrated hydraulic damping, increasing the apparent rigidity in a very limited range of rather low frequencies, by means of a column of liquid which is very long in relation to its cross section, the resonance of which counteracts large amplitude displacements, but without destroying an elastic filtering at higher frequencies.

A family of such elastic mountings is generally realized by means of a thick conical elastomer membrane which, when bonded to a support casing and to a central framework to fasten it to the housing to be suspended, e.g., a power unit, encloses a chamber containing a damping liquid forced into an expansion space, under low pressure, through a device with a long inertial column, the greatest part of the vertical load being borne by deformation of the elastomer constituting the conical membrane.

2. Description of the Prior Art

French Patent FR Nos. 2,467,724 and 2,511,105 (Peugeot) describe two devices of the type described above and which have the advantage of integrating into the elastic device the damping column housed in a rigid wall immersed in the hydraulic circuit thus constituted, after sealing, e.g., by crimping on an attachment cover for the casing, of the mounting, which is thereby made into a one-piece component.

When such an apparatus, which exhibits great flexibility in all directions, is used for the suspension of a power unit, it absorbs the reactions due to the motor torque, producing large longitudinal deformations, which are prejudicial to fatigue strength, which are remedied by the installation of limit stops, such as those described in the French continuation FR No. 2,543,494 to Pat. No. 2,535,261 (Citroen and Peugeot).

The above-mentioned patents are incorporated herein by reference as if the entire contents thereof were fully set forth herein.

An analysis of the prior art shows that there is a contradiction between the desire for great flexibility, which is advantageous for good filtering of vibrations, and the desire for long term strength in the presence of the large forces resulting from installation on a power unit, which exerts the motor torque geared down by the shortest transmission ratios on the short lever constituted by its elastic mountings.

OBJECT OF THE INVENTION

The object of the invention is to solve this problem by incorporating in a antivibration device, of conventional apperance and of the type used by numerous automobile manufacturers, the limit stop function, while maintaining the action of hydraulic damping of certain low frequencies, by means of a long inertial liquid column opposing, by resonance, the incident low frequency vibrations with an amplitude in the range of millimeters.

SUMMARY OF THE INVENTION

The necessary elastic stops which, in realization of the prior art, are frequently destroyed by excessive friction wear, e.g., during repeated pulses of motor torque at a low rate, are protected in the invention from local heating and wear, by being immersed in the damping liquid, since one of the characteristics of the invention consists of moving the expansion space for the damping liquid displaced by the deflections to the outside of the casing.

Two variants of the device can be used for this purpose. The first consists of coiling the damping liquid column in a circular groove located in the periphery of the rigid casing and providing communication with a cylindrical expansion chamber, formed by an elastic membrane and fixed by collars at its ends, around the casing.

Another solution consists of location the outlet of the damping liquid column in a tube which connects with an elastic space, consisting of a one piece elastomer bladder cast onto the end of said connecting tube.

In general, the invention features a vibration isolation apparatus, the vibration isolation apparatus/comprising: a case member; an elastomeric member bonded to the case member, the elastomeric member and the case member substantially enclosing an internal chamber, the volume of the internal chamber being variable through deformation of the elastomeric member with respect to the case member; a deflection limiting arrangement for limiting the deflection, in at least two directions, of at least a portion of the elastomeric member with respect to the case member; an external elastomeric chamber, the external elastomeric chamber being located outside of the case member; the internal and external chambers being substantially filled with a damping fluid; the internal and external chambers each having a communication port for communicating the damping fluid; and an inertial column of damping fluid interconnecting the communication ports of the internal and external chambers, the transverse dimensions of the inertial column of damping fluid being substantially smaller than the length of the inertial column of damping fluid.

The characteristics and variants of the invention are described below in greater detail, with reference to the accompanying drawings:

BRIEF DESCRIPTION OF THE DRAWINGS

FIG. 1 shows the possible deflections in all the directions of the antivibration isolation device;

FIG. 2 shows a partial axial section of the device in another configuration; and FIG. 3 is a view in partial section of the bladder constituting the external elastic space used in the configuration illustrated in FIG. 2.

DESCRIPTION OF THE PREFERRED EMBODIMENTS

FIG. 1a, which is a partial axial section of the antivibration isolation device assembled, and FIG. 1b, which is a partial horizontal section at the level of the column of damping liquid, show the possible deflection in all the directions of the antivibration isolation device.

In FIG. 1a, which shows the assembled device in cross section, the components of the vessel consist of:
- a rigid casing 1, generally made of metal, which can be fastened to the frame by means of a central screw 2;
- a conical elastomer membrane 3, whose axial deformation bears the static load, due to gravity, of a power unit or a truck cabin;
- a rigid external framework 4, generally made of metal, bonded during the vulcanization operation to the conical elastomer membrane 3, the rigid external framework 4 being crimped, in a sealed manner, on the rigid casing 1, by an elastomer rim 7 on the periphery of the rigid external framework 4; [In other words, rigid external framework 4 is of a generally flared cylindrical shape, is vulcanized to conical elastomer membrane 3 and has a projecting upper edge which provides a means for attachment, through a crimping operation, of conical elastomer membrane 3 and attached rigid external framework 4 to rigid casing 1. The elastomer rim 7 is positioned between rigid external framework 4 and rigid casing 1. As discussed more fully below, elastomer rim 7 is provided with a peripheral recess which extends over a major portion of its circumference, the peripheral recess being interrupted by a nonrecessed portion 17 (shown in FIG. 1b). When elastomer rim 7 is positioned between rigid external framework 4 and rigid casing 1 (i.e., in the assembled configuration), this peripheral recess forms, with thrust washer 10 and rigid casing 1, a circumferential passageway 11 extending nearly completely around the periphery of the device.]
- a rigid internal framework 5 which has, toward the outside, a fastening screw 6 in the direction of the load exerted and, toward the inside of the device, a shaft 8 designed to support the assembly 9 consisting of the deflection limit stops rigidly connected with their support washer, said rigid internal framework 5 also being bonded, during the vulcanization operation, to the conical elastomer membrane 3;
- the assembly 9 constituted by the deflection limit stops rigidly connected with the support washer, firmly crimped on the shaft 8 of the rigid internal framework 5 by cold riveting or hot riveting employing local induction heating, interrupted before there could be any damage to the nearby elastomers.

The deflection stops of the assembly 9 are designed to limit travel in the three directions, and consist of a damping elastomer which is very resistant to fatigue, such as a formulation on the basis of a polyurethane elastomer.

The deflection limit in the direction of compression is achieved by progressive contact with the bottom of the rigid casing 1, with an axial gap j in the operating position.

The deflection limitation in the direction of decompression is achieved by contact with a metal thrust washer 10 interposed, before crimping, between the rigid casing 1 and the rigid external framework 4. The metal thrust washer 10 will be engaged on the shaft 8 of the rigid internal framework 5 before the riveting of the assembly 9 consisting of the stops and their support washer. Even if there were to be contact, when no load is exerted, between the metal thrust washer 10 and the deflection limit stops of the assembly 9, there would be, in the position under load, a gap m between these two elements.

In the transverse direction, an elastic contact with the inside diameter of the rigid casing 1 will limit the radial gap k, although after maximum crushing, the deflection from the center position must not exceed the no-load distance "l" between the shaft 8 of the rigid internal framework 5 and the metal thrust washer 10.

The metal thrust washer 10 can be in tight contact with the rigid external framework 4, thanks to the shape of the conical elastomer membrane 3, which ends in a rim alongside the rigid external framework 4. Thus, this rim on elastomer membrane 3 allows a tight seal to be formed.

The device is supplemented by a cylindrical external elastomer membrane 12, affixed to the outside of the rigid casing 1 by collars 13 and 14 of the prior art.

By virtue of this arrangement, it is easy to fill the device with the damping liquid, after the crimping of the assembly and before the attachment of the collars 13 and 14. That is, the assembly, after crimping and before attachment of membrane 12 by collars 13 and 14, can be filled with damping fluid through a hole 15 (discussed further below) provided in rigid casing 1.

FIG. 1b, which is a partial horizontal section of FIG. 1a at the level of the column of the damping liquid 11, illustrates the damping fluid communications in the device.

A hole 16, e.g., in the form of a notch, on the edge of the metal thrust washer 10 (seen from above) allows communication between the interior chamber in the device—consisting of the rigid casing 1 and the conical elastomer membrane 3—with a circular groove housing a column 11 for the damping liquid. As discussed above, the column 11 is formed by a recess provided in elastomer rim 7 in conjunction with casing 1 and thrust washer 10, and column 11 extends around a major portion of the periphery of the device. The column 11 is interrupted, in the vicinity of the hole 16 in the metal washer 10, by a projection 17 of the elastomer rim 7 located around the periphery of the rigid external framework 4, the projection 17 fully blocking the cross section of the column 11.

The other end of the column of damping liquid 11 communicates with the outside of the rigid casing 1 by means of a hole 15 in the wall of the rigid casing, which extends into the external cylindrical elastomer membrane 12.

One of the essential advantages of the invention is achieved by this configuration. The relative arrangement, i.e., the orientation, during crimping, of the hole 15 in the wall of the rigid casing 1 and of the hole 16 in the metal thrust washer 10, makes it possible to adjust the length of the column of damping liquid 11, which can then exceed three-quarters of the periphery of the rigid casing 1. This ability to adjust the length of the column of damping liquid 11 is, therefore, a control parameter for the resonance frequency of the device.

FIG. 2 is a partial axial section of the device in a different configuration.

The circulation of the damping liquid—outside the space enclosed by the rigid casing 1 and the conical elastomer membrane 3, bonded on one hand to the rigid internal framework 5, whose shaft 8 supports the assembly 9 consisting of the deflection limit stops rigidly connected with their support washer and, on the other hand, to the rigid external framework 4—is transferred outside the device by means of a passage 11a in the shaft of the central screw 2a which fastens the rigid casing to the frame, a screw which must have a diameter very much larger than it would have in the configuration illustrated in FIG. 1.

The column of damping liquid is realized by means of a thick-walled elastomer tube 11b which fits at the end of the passage 11a over the central screw which fastens the rigid casing to the frame 2a.

The thick wall of the elastomer tube 11b, thanks to its resistance to deformation, allows the column of damping liquid to maintain a nearly constant cross section, but still assume a curvature which allow it to be installed in a restricted zone, e.g., along the frame of the vehicle.

The function of this column of damping liquid, whose length is on the order of 20 to 25 times the average diameter, is to allow free passage to the damping liquid toward an expansion bladder which expands the contracts, alternately, under a low dynamic pressure.

FIG. 3 is a view in partial section of the bladder constituting the external elastic space used in the configuration in FIG. 2.

The thick-walled elastomer tube 11b has a bladder 18—cast onto the end of said tube under the action of internal pressure—at its end, and which is deformed, preferentially, under the effect of alternating low dynamic pressures of the damping liquid exerted by the deflection of the elastic support, leaving the dimensions of the thick-walled elastomer tube 11b practically unchanged.

The height H of the elastic antivibration isolation device varies, as a function of the deflection of the support, at the preferential frequency where the damping is desired. The column of damping liquid 11a contained in the thick-walled elastomer tube 11b, is subjected to alternating displacements, amplified in the ratio of the effective cross section—which the conical elastomer membrane 3 exhibits to the variations of the height H of the elastic mounting, in relation to the average cross section of the thick-walled elastomer tube 11b—and is forced into the expansion bladder for the damping liquid 18, whose diameter and length increase simultaneously, this increase compensating approximately for the variation of the height H of the entire device.

Such displacements of the damping liquid, with an amplitude exceeding ten centimeters along the column for deflections of more or less one millimeter over the height H of the entire device, play the same role, in the configuration illustrated in FIG. 1, by expansion of the external cylindrical elastomer membrane 12 and in the configuration illustrated in FIG. 2, by a volume expansion (radial and longitudinal) of the damping liquid expansion bladder 18.

These deformations, in the range of millimeters, are caused by alternating tensile stresses, but are of such low amplitude that the fatigue strength of the device is not adversely affected.

However, the portions of the device which are subjected to the most severe deformation stress, such as the cylindrical external elastomer membrane 12 visible in FIG. 1, or the damping liquid expansion bladder 18 shown in FIG. 3, which are elements outside the device itself, can be easily replaced, in case of failure, without the need to take the vehicle out of service for a long period of time.

The construction of such a device consists, preferably, of the following operations:

first of all, during a casting operation well known in the rubber transformation industry, the fabrication of the assembly consisting of the rigid internal framework 5, the conical elastomer membrane 3 and the rigid external frame-work 4. The intimate bonding of these three elements takes place at the same time as the vulcanization of the elastomer compound;

separately, in a similar casting operation, the assembly 9 is realized, consisting of the deflection limit stops which are rigidly connected to their support washer;

an assembly operation makes it possible to install the metal thrust washer 10 and to attach the assembly 9 consisting of the deflection limit stops rigidly connected with their support washer, to the shaft 8 of the rigid internal framework 5;

a crimping operation completes the installation of the assembly previously constituted in the rigid casing 1.

Depending on the variant of the device selected, one of the following operations is then performed:

either the mechanical installation of the device in the configuration illustrated in FIG. 1 is completed, and the device is filled with damping liquid by applying, to the periphery of the rigid casing 1, an external cylindrical elastomer membrane 12, fabricated separately, which is attached to the rigid casing 1 by collars 13 and 14; or the mechanical installation of the device in the configuration illustrated in FIGS. 2 and 3 is completed, and the device is filled with damping liquid, and then the thick-walled elastomer tube 11b which ends in the damping liquid expansion bladder is attached to it.

The damping liquid expansion bladder 18 which is on the end of, and is an integral part of, the thick-walled elastomer tube 11b, is obtained by casting and vulcanization of the crimped end of the tube after expansion in the hollow vessel or die, under the action of an internal pressure, the effect of which is to reduce the thickness of the wall and to make the zone constituting the expansion bladder 18 more deformable than the thick-walled elastomer tube.

The antivibration isolation device with integrated hydraulic damping which is the object of the invention and is designed to provide elastic suspension for the power units of motor vehicles or truck cabins, has the following advantages in relation to the solutions of the prior art:

although its appearance is similar to that of conventional antivibration mountings incorporating hydraulic damping, it eliminates the need to add additional deflection limit stops, which frequently fail as a result of mechanical wear;

thanks to the adaptability of the installation of the components, it is possible to adjust the length of the column of damping liquid, and consequently, to regulate the resonance frequency of the system; and thanks to the design which transfers the most highly-stressed elements to the outside of the rigid crimped casing, it allows those parts to be replaced, if they fail, without having to take the vehicle out of service for extended periods of time.

A technician skilled in the art, of course, can make various modifications to the elastic antivibration isolation device with integrated hydraulic damping which is the object of the invention, and to its variants, which are described merely for purposes of illustration and are in no way intended to limit the invention, without going beyond the context of the invention.

The invention as described hereinabove in the context of the preferred embodiments is not to be taken as limited to all of the provided details thereof, since modification and variations thereof may be made without departing from the spirit and scope of the invention.

What is claimed is:

1. A vibration isolation apparatus, said vibration isolation apparatus comprising:
   a case member;
   elastomeric member means bonded to said case member, said elastomeric member means and said case member substantially enclosing an internal chamber, the volume of said internal chamber being variable through deformation of said elastomeric member means with respect to said case member;
   deflection limiting means for limiting the deflection, in at least two directions, of at least a portion of said elastomeric member means with respect to said case member;
   an external elastomeric chamber, said external elastomeric chamber being located outside of said case member;
   said internal and external chambers being substantially filled with a damping fluid;
   said internal and external chambers each having a communication port for communicating said damping fluid;
   an inertial column of damping fluid interconnecting said communcation ports of said internal and external chambers, and transverse dimensions of said inertial column of damping fluid being substantially smaller than the length of said inertial column of damping fluid; and
   means for adjusting the effective length of said inertial column of damping fluid to thereby adjust the frequency of resonance of said vibration isolation apparatus.

2. The apparatus according to claim 1, wherein said inertial column of damping fluid is located within said case member and extends substantially adjacent to the internal periphery thereof.

3. The apparatus according to claim 1, wherein said elastomeric member means comprises an elastomeric membrane of substantially conical shape, and wherein said deflection limiting means comprises a thrust washer rigidly mounted in said internal chamber, said thrust washer having a throughgoing opening, a substantially rigid deflection control member rigidly bonded to said substantially conical elastomeric membrane and extending through said opening in said thrust washer and into said interior chamber, and resilient contacting means mounted on said deflection control member and positioned adjacent said thrust washer and the interior walls of said case member for limiting, by contact therewith, the deflection of said substantially conical elastomeric membrane.

4. The apparatus according to claim 2, wherein said elastomeric member means comprises an elastomeric membrane of substantially conical shape, and wherein said deflection limiting means comprises a thrust washer rigidly mounted in said internal chamber, said thrust washer having a throughgoing opening, a substantially rigid deflection control member rigidly bonded to said substantially conical elastomeric membrane and extending through said opening in said thrust washer and into said interior chamber, and resilient contacting means mounted on said deflection control member and positioned adjacent said thrust washer and the interior walls of said case member for limiting, by contact therewith, the deflection of said substantially conical elastomeric membrane.

5. The apparatus according to claim 2, wherein said communication port of said external elastomeric chamber comprises a throughgoing orifice formed in said case member, and wherein said adjusting means for adjusting the length of said inertial column of damping fluid comprises a partially annular passage extending substantially adjacent to the internal periphery of said case member, said throughgoing orifice formed in said case member communicating with said partially annular passage, and means for locating said communication port for said internal chamber at a plurality of positions along said partially annular passage.

6. The apparatus according to claim 5, wherein said communication port of said external elastomeric chamber comprises a throughgoing orifice formed in said case member, and wherein said adjusting means for adjusting the length of said inertial column of damping fluid comprises a partially annular passage extending substantially adjacent to the internal periphery of said case member, said throughgoing orifice formed in said case member communicating with said partially annular passage, and means for locating said communication port for said internal chamber at a plurality of positions along said partially annular passage.

7. The apparatus according to claim 6, wherein said partially annular passage is formed, at least in part, by an annular elastomeric rim member having a partially annular recess formed therein, the opposite ends of said partially annular recess being separated by a partition of nonrecessed elastomeric material, wherein said partially annular passage is also formed, at least in part, by said thrust washer being in contact with said elastomeric rim member, wherein said communication port for said internal chamber comprises an opening in said thrust washer, and wherein said means for locating said communication port for said internal chamber comprises means for aligning said thrust washer in a plurality of rotational dispositions with respect to said throughgoing orifice formed in said case member.

8. The apparatus according to claim 7, wherein the rotational disposition of said thrust washer is infinitely adjustable with respect to said throughgoing orifice formed in said case member.

9. The apparatus according to claim 7, further comprising an external frame member adhered to an external peripheral surface of said substantially conical elastomeric membrane, and wherein said elastomeric rim member and said thrust washer are clamped and maintained in place between said external frame member and said case member, said external frame member and said case member being sealingly crimped together.

10. The apparatus according to claim 1, wherein said communication port for said external chamber comprises a throughgoing orifice formed in said case member, and wherein said external elastomeric chamber comprises an elastomeric sleeve positioned over the exterior periphery of said case member, said elastomeric sleeve covering said throughgoing orifice, and further comprising a pair of encircling collars for securing said elastomeric sleeve to said case member, whereby said external elastomeric chamber may be readily replaced when worn.

11. The apparatus according to claim 5, wherein said communication port for said external chamber comprises a throughgoing orifice formed in said case member, and wherein said external elastomeric chamber comprises an elastomeric sleeve positioned over the exterior periphery of said case member, said elastomeric sleeve covering said throughgoing orifice, and further comprising a pair of encircling collars for securing said elastomeric sleeve to said case member, whereby said external elastomeric chamber may be readily replaced when worn.

12. The apparatus according to claim 7, wherein said communication port for said external chamber comprises a throughgoing orifice formed in said case member, and wherein said external elastomeric chamber comprises an elastomeric sleeve positioned over the exterior periphery of said case member, said elastomeric sleeve covering said throughgoing orifice, and further comprising a pair of encircling collars for securing said elastomeric sleeve to said case member, whereby said external elastomeric chamber may be readily replaced when worn.

13. The apparatus according to claim 9, wherein said communication port for said external chamber comprises a throughgoing orifice formed in said case member, and wherein said external elastomeric chamber comprises an elastomeric sleeve positioned over the exterior periphery of said case member, said elastomeric sleeve covering said throughgoing orifice, and further comprising a pair of encircling tightenable collars for securing said elastomeric sleeve to said case member, whereby said external elastomeric chamber may be readily replaced when worn.

14. The apparatus according to claim 1, wherein said external elastomeric chamber comprises an elastic deformable bladder and wherein said inertial column of damping fluid is contained in an elastomeric tube, said elastomeric tube being flexible but having substantially greater resistance to radial deformation than said elastic bladder, whereby said external chamber is made readily available for replacement upon undue wear, while said inertial column of damping fluid is constrained so as to maintain a substantially constant cross section.

15. The apparatus according to claim 14, wherein said elastomeric member means comprises an elastomeric membrane of substantially conical shape, and wherein said deflection limiting means comprises a thrust washer rigidly mounted in said internal chamber, said thrust washer having a throughgoing opening, a substantially rigid deflection control member rigidly bonded to said substantially conical elastomeric membrane and extending through said opening in said thrust washer and into said interior chamber, and resilient contacting means mounted on said deflection control member and positioned adjacent said thrust washer and the interior walls of said case member for limiting, by contact therewith, said deflection of said substantially conical elastomeric membrane.

16. The apparatus according to claim 15, wherein said communication port for said internal chamber comprises a hollow attachment member attached to said case member for attachment of said vibration isolation device in application, said elastomeric tube being connected to said hollow attachment member.

17. A vibration isolation apparatus, said vibration isolation apparatus comprising:
   a case member;
   elastomeric member means bonded to said case member, said elastomeric member means and said case member substantially enclosing an internal chamber, the volume of said internal chamber being variable through deformation of said elastomeric member means with respect to said case member;
   deflection limiting means for limiting the deflection, in at least two directions, of at least a portion of said elastomeric member means with respect to said case member;
   an external elastomeric chamber, said external elastomeric chamber being located outside of said case member;
   said internal and external chambers being substantially filled with a damping fluid;
   said internal and external chambers each having a communication port for communicating said damping fluid;
   an inertial column of damping fluid interconnecting said communication ports of said internal and external chambers, the transverse dimensions of said inertial column of damping fluid being substantially smaller than the length of said inertial column of damping fluid; and
   means for adjusting the actual physical length of said inertial column of damping fluid to thereby adjust the frequency of resonance of said vibration isolation apparatus.

* * * * *